(12) United States Patent
Ingalls

(10) Patent No.: US 9,118,743 B2
(45) Date of Patent: Aug. 25, 2015

(54) MEDIA RENDERING CONTROL

(71) Applicant: VOXER IP LLC, San Francisco, CA (US)

(72) Inventor: Matt J. Ingalls, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 317 days.

(21) Appl. No.: 13/901,463

(22) Filed: May 23, 2013

(65) Prior Publication Data

US 2014/0351382 A1  Nov. 27, 2014

(51) Int. Cl.
*H04L 29/06* (2006.01)

(52) U.S. Cl.
CPC .......... *H04L 65/602* (2013.01); *H04L 65/4069* (2013.01)

(58) Field of Classification Search
CPC .......................... H04L 65/4069; H04L 65/602
USPC ........................................................ 709/219
See application file for complete search history.

(56) References Cited

U.S. PATENT DOCUMENTS

| | | | |
|---|---|---|---|
| 7,925,770 B1 * | 4/2011 | Hamel et al. | 709/231 |
| 8,107,604 B2 * | 1/2012 | Katis et al. | 379/93.01 |
| 8,849,948 B2 * | 9/2014 | Gilson | 709/217 |
| 2003/0005139 A1 * | 1/2003 | Colville et al. | 709/231 |
| 2005/0140683 A1 * | 6/2005 | Collins et al. | 345/531 |
| 2005/0166135 A1 * | 7/2005 | Burke et al. | 715/500.1 |
| 2006/0083165 A1 * | 4/2006 | McLane et al. | 370/229 |
| 2006/0095401 A1 * | 5/2006 | Krikorian et al. | 707/1 |
| 2006/0149850 A1 * | 7/2006 | Bowman | 709/231 |
| 2006/0184261 A1 * | 8/2006 | Ng et al. | 700/94 |
| 2007/0011343 A1 * | 1/2007 | Davis et al. | 709/231 |
| 2007/0237073 A1 * | 10/2007 | Jutzi | 370/229 |
| 2008/0022350 A1 * | 1/2008 | Hostyn et al. | 725/139 |
| 2008/0147213 A1 * | 6/2008 | Omiya et al. | 700/94 |
| 2009/0258608 A1 * | 10/2009 | Katis et al. | 455/90.2 |
| 2010/0235530 A1 * | 9/2010 | Huang et al. | 709/231 |
| 2011/0161976 A1 * | 6/2011 | Alexander et al. | 718/104 |
| 2011/0280408 A1 * | 11/2011 | Falcon | 381/56 |
| 2013/0176911 A1 * | 7/2013 | Katis et al. | 370/276 |

* cited by examiner

*Primary Examiner* — Alina N Boutah
(74) *Attorney, Agent, or Firm* — Beyer Law Group LLP

(57) ABSTRACT

One aspect of the invention pertains to a method for adjusting a rendering speed for media that is received over a network at a receiving device. The latency for the received media is determined. Based on the latency, a consumption speed is determined. The media is then rendered at the determined consumption speed.

28 Claims, 4 Drawing Sheets

MEDIA RENDERING CONTROL

FIELD OF THE INVENTION

The present invention pertains to telecommunications. More specifically, the invention relates to a telecommunication and multimedia management method and apparatus that enables users to review messages as they are being transmitted. Various embodiments of the present invention adjust the rendering speed of the message depending on latency or network conditions.

BACKGROUND OF THE INVENTION

There are a wide variety of communication systems for mobile and computing devices. Some popular examples including instant messaging, email, phone calls, texting and Voice over IP (VoIP). Each approach has its own distinctive features and advantages and work well for many applications.

The assignees of the present application have filed a variety of patent applications that describe a new type of voice or media messaging system. In various implementations of this system, media is progressively generated and sent from one device to another. When the media arrives at the receiving device, it is stored and rendered. Users are able to easily shift between two different modes of operation. In the first mode, users can communicate (e.g., using audio, video or some other type of media or signal) in real time or near real time. In the second, time-shifted mode, users can engage in a series of back and forth delayed transmissions. That is, any sent messages are stored on the receiving device and can be reviewed at any time, even while new messages are concurrently being created, transmitted and downloaded.

The assignees of the present application have filed multiple applications exploring modifications and improvements of the above communications protocol. Although the above system works well, there are ongoing efforts to improve its reliability, performance and the quality of the user experience.

SUMMARY OF THE INVENTION

The present inventions relates to a media messaging system. In this system, media is transmitted from one device to another over a network. The media is written to a storage system on the receiving device and then rendered. In various applications, it is advantageous to control the buffering process and in particular the render speed. Under some circumstances, for example, decreasing the render speed can help improve the rendering quality. Under other conditions, increasing the render speed can allow a user to shift from a time-delayed mode to a (near) real time communication system.

In one aspect of the present invention, a method for adjusting or calculating a rendering speed for media will be described. Media is received over a network at a receiving device. In various embodiments, the media is progressively rendered while it is being received. Rendering latency is determined for the received media. Based on the latency, a consumption speed is determined. The media is rendered at the determined consumption speed. In various embodiments, these operations are repeated such that the rendering speed is automatically and rapidly adjusted (e.g., 40-60 times per second) without any user involvement.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Figure 1:
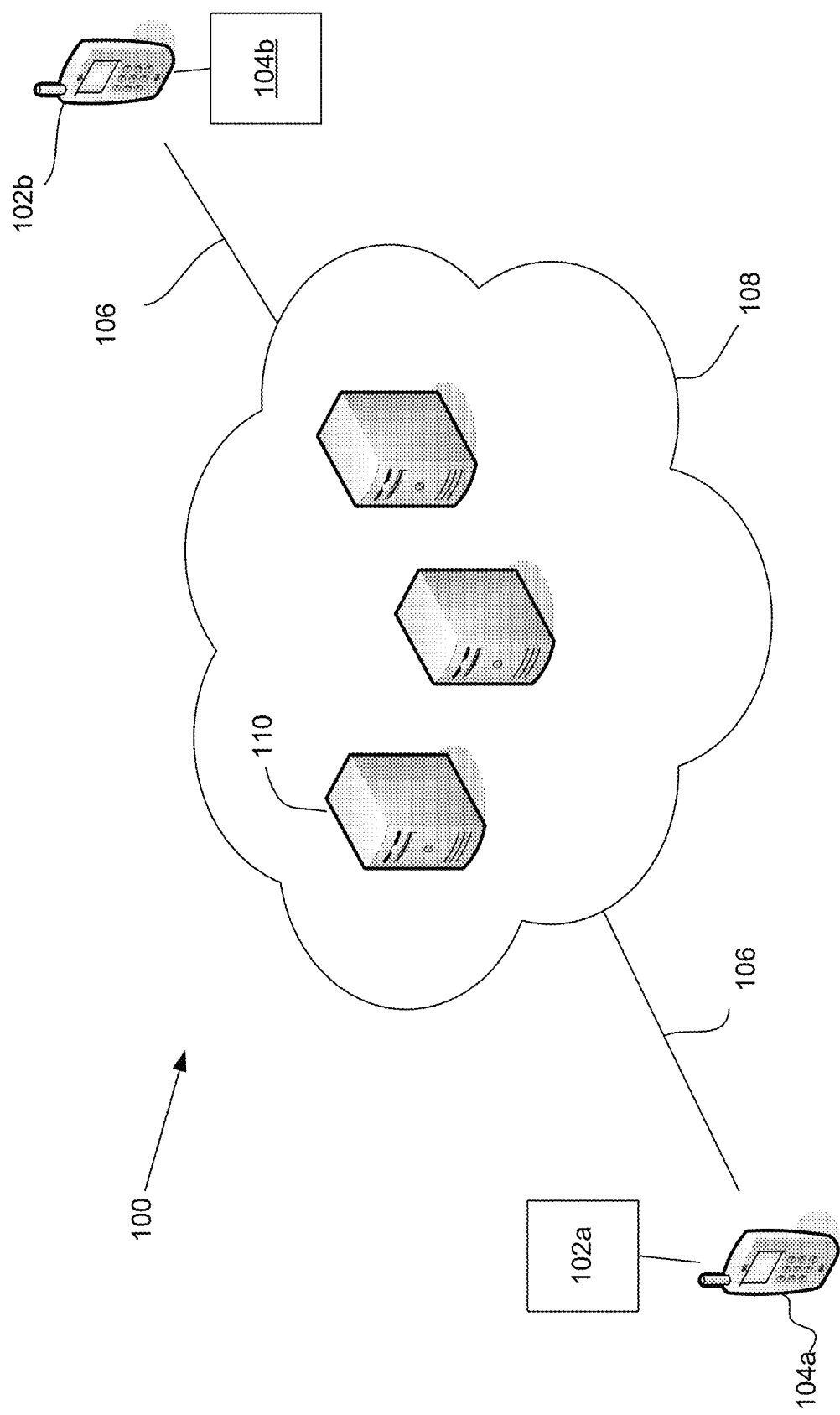
FIG. 1 is a diagram of a communication and media management system according to a particular embodiment of the present invention.

The present invention relates generally to a communications application that enables users to transmit media (e.g., voice calls, video, text, audio, sensor information, etc.) to one another. Users can communicate with one another using one of two modes. In the first mode, users can receive a message in real time or near real time, somewhat similar to a phone call. In the second mode, the user's participation in a conversation is time-shifted. That is, messages are reviewed at a different time than they are received. A notable feature of this communications application is that a user can easily transition between one mode and the other. The above media messaging system is discussed in multiple patent documents that have been filed by the assignee of the present application. These patent documents include U.S. patent application Ser. No. 13/555,034 (referred to herein as the '034 application) and Ser. No. 13/466,011, which are each incorporated herein in their entirety for all purposes.

Various embodiments of the present invention relate to methods and mechanisms for adjusting the render consumption speed of media at a device based on the latency. Consider the following example in which a friend contacts the user of a mobile phone. As the friend is speaking, a message is simultaneously generated and streamed into the user's mobile phone. The user notices the incoming message a few seconds or minutes after the friend started speaking. After the user presses a suitable button on the mobile phone, the downloaded portion of the message is played or rendered for the user, while the friend continues to speak and stream later parts of the message into the mobile phone. That is, the point in the message where the rendering is taking place may be slightly or substantially behind the point in the message where downloading and storage is taking place.

This time delay or latency can be influenced by a variety of factors, including user behavior and network conditions. For example, if network conditions are good and the user starts listening to the message some time after the friend started speaking, then the difference between the two points could be large, since much of the message has already been stored in the mobile phone and relatively little of that has been rendered. On the other hand, if network conditions are poor, then the difference between the two points may be extremely small, since new, later portions of the message are being downloaded slowly and the message is rendered far more quickly then it is received and stored.

Various implementations of the present invention involve automatically adjusting the speed at which the message is played or rendered for a user based on latency. In a situation where latency is large, an increase in the render consumption speed can allow the user to "catch up" to the point in the message where new portions of the message are being stored. If network conditions are good, the user and the friend can then have a real time or near real time conversation, similar to that of a conventional telephone. On the other hand, in situations where latency is very small, it can be advantageous to slow down the render consumption speed. This provides more time for more of the message to be stored before it is rendered, which can reduce stuttering in the playing of the message. Various approaches for adjusting the render consumption speed are discussed with reference to the figures below.

Referring initially to FIG. 1, a block diagram of a telecommunication and media management system 100 according to one embodiment of the present invention is shown. The system 100 includes clients 102a/102b running on devices 104a/104b. The devices 104a/104b communicate with one another through one or more networks 108 that connect the devices 102a/102b to a communication services network 108. The communications services network 108 includes servers 110. In various embodiments, the networks 108 may be the Public Switched Telephone Network (PSTN), a cellular network based on CDMA or GSM or any other suitable protocol, the Internet, a tactical radio network or any other communication network. The devices 102a/102b may be any suitable communication device, including but not limited to a laptop, tablet, computing device or mobile phone.

In this example, device 102a is sending a message or media stream to device 102b. For example, a camera, microphone or other media capturing tool on the device 102a may be used to obtain video, sound or images. This media is then streamed (e.g., progressively created and transmitted at the same time) to the device 102b. The generation, sending, storage and receiving of the media may be performed in a wide variety of ways. For example, the clients 104a/104b and devices 102a/102b may communicate in any manner described in U.S. patent application in the '034 application. In the illustrated embodiment, the media is streamed to one or more servers 110, which in turn store the media and stream it to the device 102b for rendering.

Figure 2:
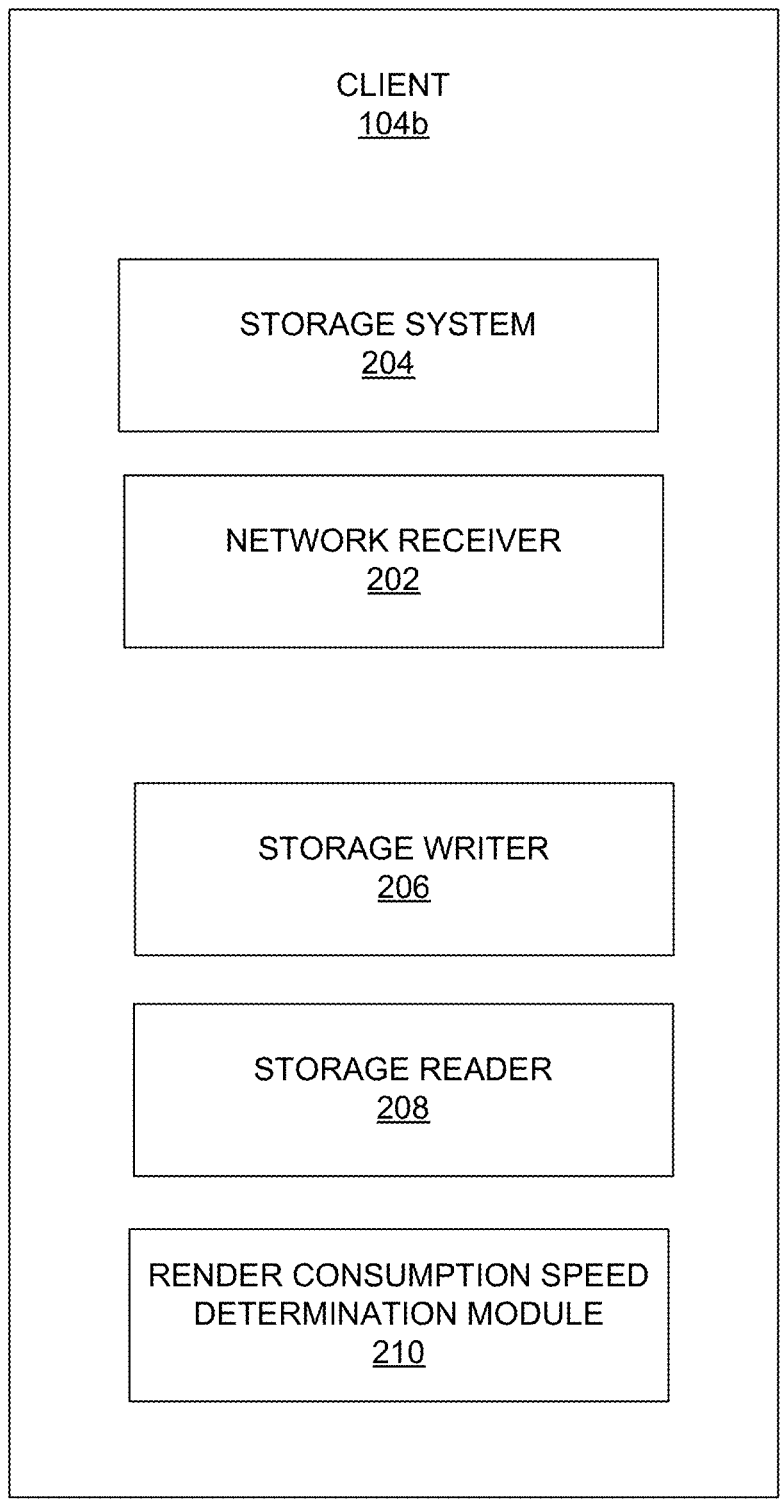
FIG. 2 is a block diagram of a device that is receiving a media stream according to a particular embodiment of the present invention.

Referring next to FIG. 2, a block diagram of a client 104b running on the receiving device 102b of FIG. 1 will be described. The client 104b includes a network receiver, a storage writer, a storage system, a storage reader and a render consumption speed module.

The network receiver 202 is any software and hardware suitable for receiving a media stream, messages or data over the network. The network receiver 202 passes on such media to the storage writer 206 and the storage system 204.

The storage system 204 is arranged to store, organize and retrieve media, such as media that is received from another device (e.g., device 102a in FIG. 1). The media may be stored in any suitable physical medium, including but not limited to RAM, flash memory, hard drives, optical media, volatile memory, non-volatile memory or some combination thereof. In various embodiments, the storage system 204 organizes the received media as a series of time-stamped and sequentially numbered payload data structures. Some approaches involve the storage system 204 acting as an adaptive de-jitter buffer. That is, it receives media packets that are sent over the network. Depending on network conditions, the media packets may arrive out of order or delayed. The storage system acts as a buffer for the received packets, so that they can be reordered and accumulated as appropriate and then sent out in their proper sequence to the storage reader 208 for rendering. Under some conditions, packets in a sequence may be rendered even when some of the packets in the sequence have not yet arrived. This allows for faster but possibly lower quality rendering. In still other embodiments, the packets are selectively dropped or modified. Some designs, for example, involve a pause removal feature, in which pauses in audio-based media are reduced or eliminated by the removal or dropping of the corresponding packets. The storage device 204 also includes any suitable indexes or data structures necessary to support operations performed by the storage writer 206 and the storage reader 208. In various embodiments, the storage system 204 includes a wide variety of additional features, including any feature of the Persistent Infinite Message Buffer (PIMB) 30 or other buffer/storage modules described in the '034 application.

The storage writer 206 is arranged to write data to the storage system 204. Generally, the writing of data is performed in two instances. One such instance is after media has been streamed into the device 102b over the network 106. The storage writer 206 writes the data to the storage system 204 so it can be rendered afterward. Additionally, if the device 102b is used to transmit rather than receive, the storage writer 206 may write media captured through a microphone, camera other media capturing tool on the device 102b. The storage writer 206 may have a variety of other features as well, including any feature discussed in connection with the PIMB writer 28 of the '034 application.

The storage reader 208 is arranged to read data stored on the storage system 204. After media has been downloaded over a network into the storage system 204, the storage reader 208 reads and renders the downloaded media. Additionally, when the device 102b is used to transmit rather than receive media, the storage reader 208 reads media created using a media capturing tool prior to transmission. These and other possible features are discussed in connection with the PIMB reader 26 of the '34 application.

The render consumption speed determination module 210 is arranged to adjust the render consumption speed of media depending on the rendering latency. The module receives input from the storage writer 206 and reader 208 to determine the latency. In various embodiments, for example, the module 210 requests data from the storage writer 206 and reader 208 to determine the point in the current media stream/message that rendering/reading is taking place and the point in the current media stream/message that receiving/writing is taking place. Based on the difference between the two points, the module 210 determines a latency and uses the latency to adjust the render consumption speed. The module 210 then orchestrates the playing of the stored media using the adjusted speed. These operations will be discussed in greater detail below in connection with FIG. 3.

Figure 3:
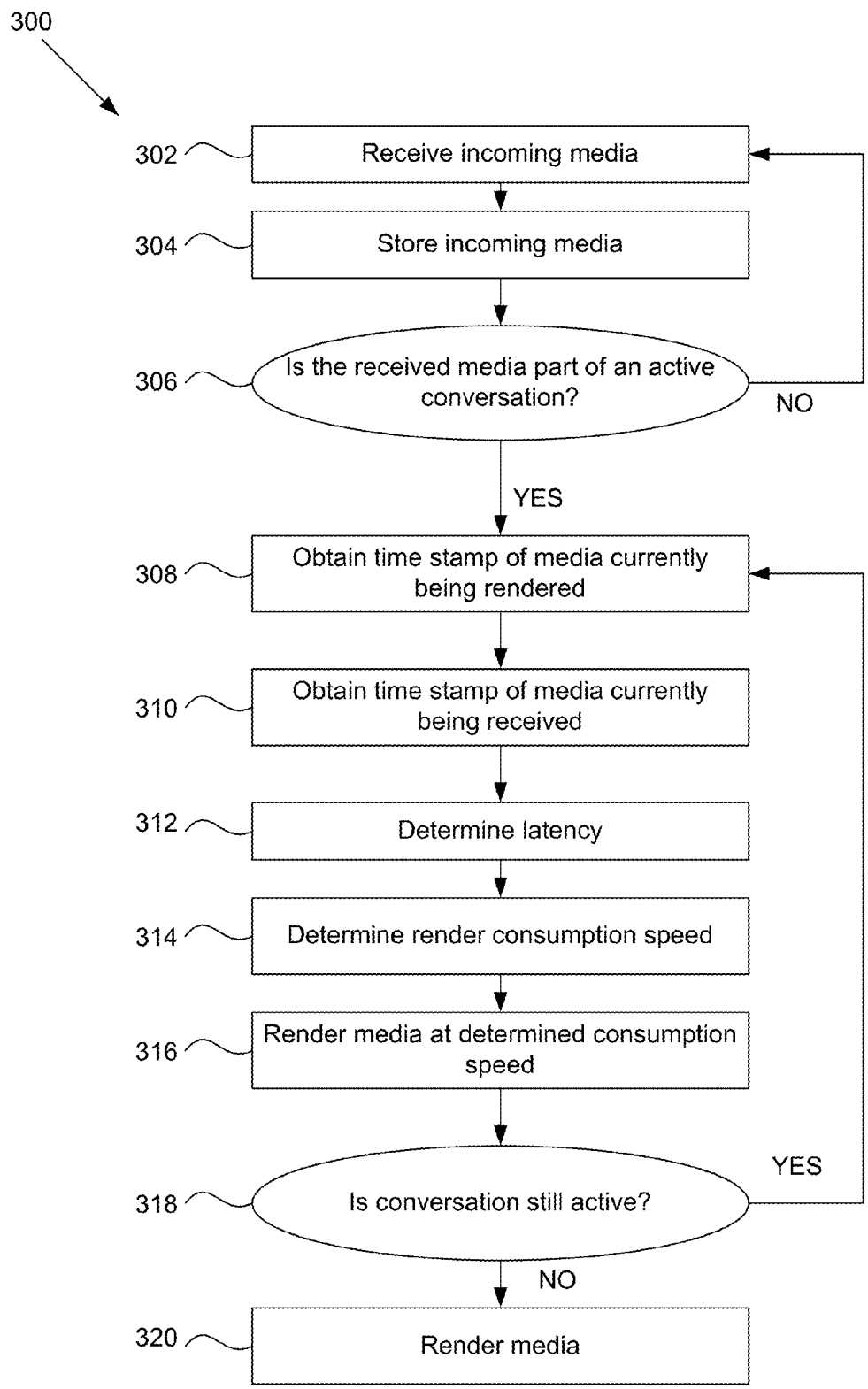
FIG. 3 is a flow diagram of a method for adjusting a render consumption speed according to a particular embodiment of the present invention.

FIG. 3 is a flow diagram illustrating a method 300 for determining the render consumption speed according to a particular embodiment of the present invention. Initially, at step 302, an incoming media stream is received at the network receiver 202 of the device 102b. The media stream may be any type of media, including video, audio, sensor data, etc. Afterward, the storage writer 206 writes the media stream to the storage system 204 (step 304).

At step 306, the render consumption speed determination module 210 determines whether the received media stream is part of an active conversation. What constitutes an active conversation may vary, depending on the needs of a particular application. In some implementations, for example, the media stream is part of an active conversation if the media stream is still being progressively received and rendered at the receiving device 102b. In other implementations, the media stream is part of an active conversation if the media stream is part of a thread of messages or media streams between two or more users and one or more of the threaded media streams is currently being progressively received and rendered at the receiving device 102b. In still other approaches, the media stream is part of an active conversation if it is part of a series of communications between the two connected devices over a live connection that has not yet been terminated by either device 102a/102b.

If the received media is not part of an active conversation, the method loops back to step 302. Step 302 and the later steps are then repeated. If the media is part of an active conversation, then the render consumption speed determination module 210 obtains a time stamp of the media currently being rendered from the storage reader 208 (step 308). The module 210 also obtains a time stamp of the media currently being written from the storage writer 206 (step 310).

The render and write time stamps are any suitable values that indicate where or when in the media stream rendering and writing are currently taking place. In this context, writing refers to the writing of an unrendered portion of the media stream to the storage system 204 after it has been received over the network 106. Rendering refers to the rendering or playing of a portion of the stored media.

Figure 4:
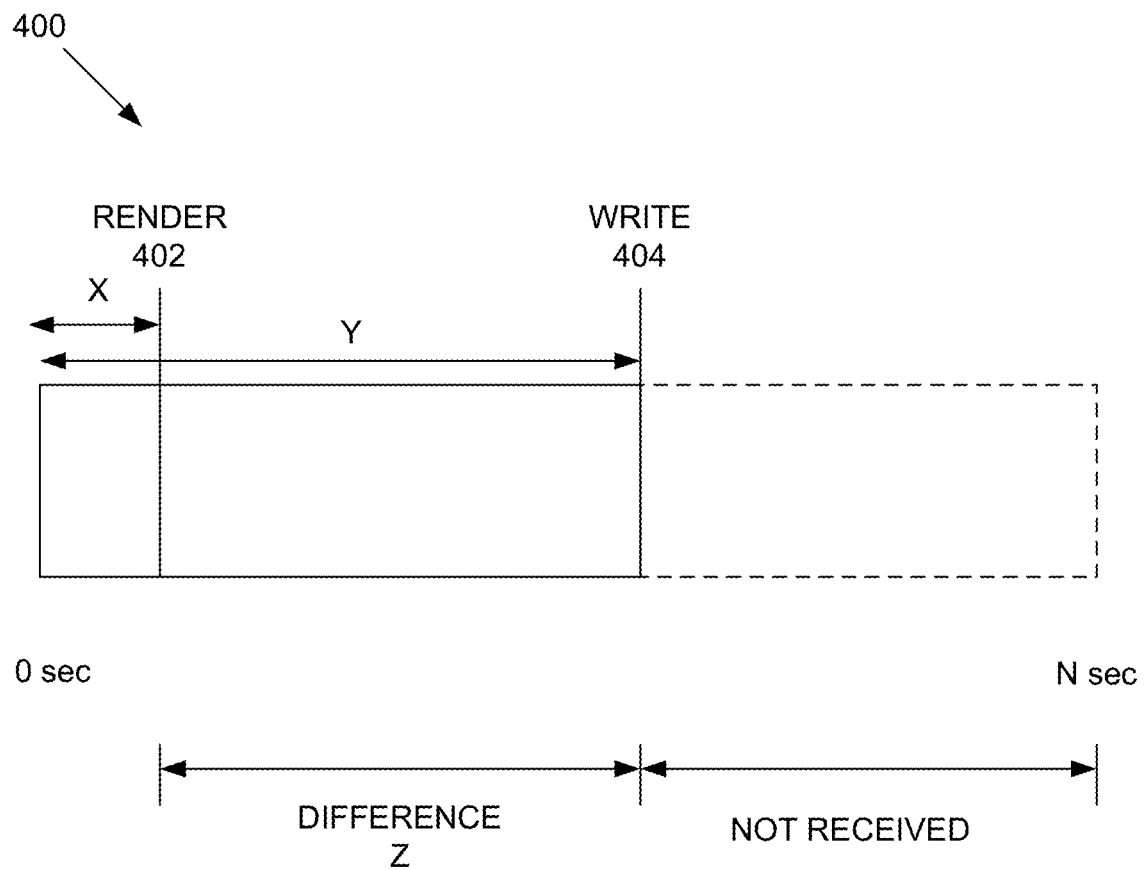
FIG. 4 is a block diagram of a media stream and render and write timestamps according to a particular embodiment of the present invention.

A diagrammatic example of the use of time stamps is shown in FIG. 4. FIG. 4 is a diagram of a media stream 400 or message (e.g., audio, video, sensor data, signal, etc.), which is transmitted between the devices 102a/102b. The render and write timestamps are marked on the media stream using points 402 and 404, respectively. There is a difference Z between the render point 402 and the write point 404. Z is the rendering latency. That is, the rendering is taking place Z seconds ahead of the writing in the media stream 400. In this example, the media stream 400 lasts a total of N seconds. Its final duration is unknown, since the media stream 400 is ongoing and is being progressively created and sent from the sending device 102a and received at the receiving device 102b.

Although the conventional meaning of the term "timestamp" implies the use of a clock-related or 24-hour standard, it should be appreciated that in the context of this invention, the term timestamp can have a wide variety of different definitions, depending on the needs of a particular application. Generally, a timestamp can refer to any value, signal or data structure that helps indicate when or where the corresponding operation (e.g., rendering, writing, etc.) is taking place. In some embodiments, for example, the timestamp refers to an offset from a point (e.g., the beginning) in the media stream. In this simple example, the render timestamp is X seconds and the write timestamp is Y seconds, which means that rendering and writing are currently taking place X and Y seconds, respectively, from the start of the media stream.

Although there are references above to read and write timestamps, it should be noted that these timestamps may be replaced by timestamps that pertain to operations other than reading or writing. For example, a render timestamp could be replaced with a timestamp that indicates when media was stored in preparation for rendering. Similarly, a write timestamp could be replaced with a timestamp that indicates when media was received at the device over a network. Generally, any suitable timestamps may be used that help determine the rendering latency.

Once the render and write timestamps are determined, the render consumption speed determination module 210 determines a rendering latency based on the timestamps (step 312). This may be determined in a variety of ways. In the illustrated embodiment, for example, the latency is based on the difference between the render timestamp and the write timestamp (e.g., in the context of FIG. 4, the latency equals render timestamp Y−write timestamp X=difference Z.) The latency calculation may also involve additional variables, such as one or more device or network parameters.

At step 314, the module 210 then determines a render consumption speed based on the latency. The render consumption speed is a speed at which to render the streamed media. As previously discussed, under certain conditions it can be advantageous to speed up the rendering of the media so that a user who is playing a stored message can "catch up" and review the message in near real time. Under other circumstances, it can be helpful to slow down the rendering of media so that a media buffer can be built up to help smooth out and improve rendering quality.

The exact method used to calculate a suitable render consumption speed can vary widely, depending on the needs of a particular application. One example approach is provided below:

(1) IF L<0.25 THEN $R_{NEW}$=0.5+2L
(2) ELSE IF L>SQUARE ROOT OF $R_{MAX}$ THEN $R_{NEW}$ = $R_{MAX}$
(3) ELSE IF L>1.25 THEN $R_{NEW}$ =SQUARE ROOT OF L
(4) ELSE $R_{NEW}$ =1+0.11*(L−0.25)
(5) A=0.8 AND B=0.2 IF $R_{NEW}$ IS MOVING TOWARDS 1.0 RELATIVE TO $R_{OLD}$
(6) A=0.95 AND B=0.05 IF $R_{NEW}$ IS MOVING AWAY FROM 1.0 RELATIVE TO $R_{OLD}$
(7) $R_{FINAL}$=A* $R_{OLD}$ +B* $R_{NEW}$

In the above formula, L refers to latency in seconds. R refers to a render consumption speed. In this example, this speed is represented in terms of a multiplier (i.e., an R of 1.0 means a normal, unadjusted rendering consumption speed or a rendering speed that is substantially or exactly the same as the speed at which the media was initially created or recorded.) $R_{NEW}$ is the current calculation of the render consumption speed. $R_{OLD}$ is the calculation of $R_{NEW}$ or $R_{FINAL}$ in a previous iteration of step 314. $R_{FINAL}$, which is based on $R_{OLD}$ and $R_{NEW}$, is the final calculation of the render consumption speed that will be used to render the media. $R_{MAX}$ is a predetermined value indicating a maximum possible render consumption speed. Generally, $R_{MAX}$ can be set at any suitable level that allows for accelerated rendering without making it overly difficult for the user to enjoy or understand the rendered media. For example, a value between 1.1 and 1.5 works well for various applications.

According to the above sample formula (lines 1-7), if latency falls below a particular threshold (e.g., below 0.25) then $R_{NEW}$ will be less than 1.0 and is lower if the latency is lower (line 1). Generally, $R_{NEW}$ is increased as L increases up to a maximum of $R_{MAX}$ (line 4). In the above model, $R_{NEW}$ depends on earlier and current calculations of R (line 7). If, over multiple calculations of R, R is trending towards 1.0, then the newer calculations of R are weighted more heavily in the current calculation of R. If R is trending away from 1.0, however, then the older calculations of R are weighted more heavily in the current calculation of R (lines 5-6).

Once the render consumption speed is calculated, it is used to play or render a stored portion of the media stream (step 316). In some embodiments, the media stream can be played using any suitable media rendering multiplier module (e.g., SOUNDTOUCH for ANDROID platforms, IPOD TIME AUDIO UNIT for the IOS and MacOS operating systems, etc.) that takes a render consumption speed multiplier value as an input and plays a designated media at that speed.

At step 318, the module 210 makes a determination as to whether the current conversation is still active. If it is still active, the method loops back to step 308. Steps 308-316 are then repeated as described above. It should be noted that for any given active conversation, these steps may be repeated very rapidly. For example, some applications involve repeating the time stamp, latency and render consumption speed calculations approximately 40 to 60 times per second. In still other embodiments, these calculations are performed between once every 10 seconds and 100 times per second. Thus, in various embodiments, the render consumption speed is constantly subject to small changes during a single active conversation.

It is also possible that the conversation is no longer active. For example, it may be that the receiving device is no longer receiving media and/or the sending device has terminated its connection. In some embodiments, the conversation is determined to be no longer active if all the media has been rendered and/or the rendered latency is 0 for a predetermined period of time. In that case, remaining stored, unrendered media is rendered (step 320) and steps 312, 314 and 316 are not repeated.

The method 300 may be modified for a variety of different applications and is not limited to the specific steps outlined in the figure and above description. Latency, for example, can be determined in a wide variety of ways that do not necessarily involve calculating distinct write and render timestamps. In some designs, latency is based on one or more device or network parameters. In still other embodiments, latency is based on the amount of the media stream or message that has been received and stored at the device 102b, but that has not yet been rendered for review by a user.

Although only a few embodiments of the invention have been described in detail, it should be appreciated that the invention may be implemented in many other forms without departing from the spirit or scope of the invention. For example, FIGS. 1 and 2 describe a device 102a/102b and client 104a/104b with particular components and modules. It should be appreciated, however, that the illustrated components and modules may be modified, combined, or separated in different embodiments. Any feature or operation of a particular module can be performed instead by a separate module or another of the illustrated modules. Additionally, the device 102a/102b may include a wide variety of additional features, including any module or feature described with respect to client 12 and device 13 of the '034 application. Therefore, the present embodiments should be considered as illustrative and not restrictive and the invention is not limited to the details given herein, but may be modified within the scope and equivalents of the appended claims.

What is claimed is:

1. A method for adjusting a rendering speed for media that is being progressively received, stored and rendered, the method comprising:
   receiving media over a network at a receiving device;
   determining a latency for the received media;
   based on the latency, determining a consumption speed at which to render the media;
   rendering the media at the determined consumption speed;
   determining a difference between a render position in the media and a write position in the media wherein the render position indicates which portion of the media is currently being rendered and the write position indicates which portion of the media is currently being written to a storage system on the device; and
   determining the latency based on a difference between the render and write positions;
   when the difference between the render and write positions exceeds a predetermined threshold, increasing a rate at which the media is played so that the difference shrinks; and
   when the difference between the render and write positions falls below a predetermined threshold, reducing a rate at which the media is played so that the difference increases.

2. A method as recited in claim 1 further comprising:
   determining how much of the media has been stored at the receiving device and not rendered; and
   when an amount of the stored and unrendered media exceeds a predetermined threshold, increasing the consumption speed at which a stored portion of the media is rendered.

3. A method as recited in claim 1 further comprising:
   determining how much of the media has been stored at the receiving device and not rendered yet; and
   when an amount of the stored and unrendered media falls below a predetermined threshold, decreasing the consumption speed at which the stored media is rendered, thereby helping to improve rendering quality.

4. A method as recited in claim 1 wherein the media is rendered at different consumption speeds over time depending on the amount of latency.

5. A method as recited in claim 1 wherein the received media is a part of a media stream that is continuously being sent from a sending device to the receiving device.

6. A method as recited in claim 1 further comprising:
   determining whether the received media is part of an active conversation;
   if the received media is not part of an active conversation, storing the received media at the receiving device without determining the latency of the received media; and
   if the received media is part of an active conversation, determining the latency for the received media.

7. A method as recited in claim 6 wherein the received media is part of an active conversation when the received media is part of an ongoing media stream that is currently being progressively received and rendered at the receiving device.

8. A method as recited in claim 1 wherein determining the latency for the received media further comprises:
   obtaining a first timestamp for a portion of the media that is being rendered;
   obtaining a second timestamp for a portion of the media that is being received over the network and written to a storage system on the device; and
   determining the latency based on the first and second timestamps.

9. A method as recited in claim 1 wherein the media comprises at least one selected from the group consisting of: voice, video, sensor data, radio signals, position and GPS information.

10. A method as recited in claim 1 wherein the receiving device comprises at least one selected from the group consisting of: a land-line phone, a wireless phone, a mobile phone, a computer, a radio, a satellite phone, a satellite radio, a tactical radio, and a tactical phone.

11. A method as recited in claim 1 further comprising automatically adjusting the consumption speed at which the media is played without any user involvement.

12. A method for adjusting a rendering speed for media that is being progressively received, stored and rendered, the method comprising:
   receiving media over a network at a receiving device;
   determining a latency for the received media;

based on the latency, determining a consumption speed at which to render the media;
rendering the media at the determined consumption speed; and
repeating the latency determination and the render consumption speed determination between 1/10th and 100 times per second.

13. A receiving device that is arranged to receive media and render the media at different speeds depending on latency, the receiving device comprising:
a storage system that is arranged to store the media;
a storage writer that is arranged to receive the media over a network and write the media to the storage system;
a render consumption speed determination module that is arranged to determine a latency for the received media and, based on the latency, to determine a consumption speed at which to render the media; and
a storage reader that is arranged to render the media at the determined consumption speed wherein:
the render consumption speed determination module is arranged to determine a difference between a render position in the media and a write position in the media; and
the determining of the latency is based on a difference between the render and write positions;
when the difference between the render and write positions exceeds a predetermined threshold, the receiving device is arranged to play the media at a higher rate so that the difference shrinks; and
when the difference between the render and write positions falls below a predetermined threshold, the receiving device is arranged to play the media at a reduced rate so that the difference increases.

14. A receiving device as recited in claim 13 wherein:
the render consumption speed determination module is arranged to determine how much of the media has been stored and not rendered yet; and
when an amount of the stored and unrendered media exceeds a predetermined threshold, the render consumption speed determination module is arranged to increase the render consumption speed at which a stored portion of the media is played.

15. A receiving device as recited in claim 13 further comprising:
the render consumption speed determination module is arranged to determine how much of the media has been stored and not rendered yet; and
when an amount of the stored and unrendered media exceeds a predetermined threshold, the render consumption speed determination module is arranged to decrease the consumption speed at which a stored portion of the media is played.

16. A computer code embedded in a non-transitory computer readable medium and intended to run on a receiving device connected to a network, the computer code configured to:
receive media over a network at a receiving device;
determine a latency for the received media;
based on the latency, determine a consumption speed at which to render the media;
render the media at the determined consumption speed; and
repeat the latency determination and the render consumption speed determination between 1/10$^{th}$ and 100 times per second.

17. A computer code as recited in claim 16, the computer code being further configured to:
determine how much of the media has been stored at the receiving device and not rendered; and
when an amount of the stored and unrendered media exceeds a predetermined threshold, increase the consumption speed at which a stored portion of the media is rendered.

18. A computer code as recited in claim 16, the computer code being further configured to:
determine how much of the media has been stored at the receiving device and not rendered yet; and
when an amount of the stored and unrendered media falls below a predetermined threshold, decrease the consumption speed at which the stored media is rendered, thereby helping to improve rendering quality.

19. A computer code as recited in claim 16 wherein the media is rendered at different consumption speeds over time depending on the amount of latency.

20. A computer code as recited in claim 16 wherein the received media is a part of a media stream that is continuously being sent from a sending device to the receiving device.

21. A computer code as recited in claim 16, the computer code being further configured to:
determine whether the received media is part of an active conversation;
if the received media is not part of an active conversation, store the received media at the receiving device without determining the latency of the received media; and
if the received media is part of an active conversation, determine the latency for the received media.

22. A computer code as recited in claim 21 wherein the received media is part of an active conversation when the received media is part of an ongoing media stream that is currently being progressively received and rendered at the receiving device.

23. A computer code as recited in claim 16, the computer code being further configured to:
obtain a first timestamp for a portion of the media that is being rendered;
obtain a second timestamp for a portion of the media that is being received over the network and written to a storage system on the device; and
determine the latency based on the first and second timestamps.

24. A computer code as recited in claim 16, the computer code being further configured to:
determine a difference between a render position in the media and a write position in the media wherein the render position indicates which portion of the media is currently being rendered and the write position indicates which portion of the media is currently being written to a storage system on the device; and
determine the latency based on a difference between the render and write positions.

25. A computer code as recited in claim 16 wherein the media comprises at least one selected from the group consisting of: voice, video, sensor data, radio signals, position and GPS information.

26. A computer code as recited in claim 16 wherein the receiving device comprises at least one selected from the group consisting of: a land-line phone, a wireless phone, a mobile phone, a computer, a radio, a satellite phone, a satellite radio, a tactical radio, and a tactical phone.

27. A computer code as recited in claim 16, the computer code being further configured to:
automatically adjust the consumption speed at which the media is played without any user involvement.

28. A computer code embedded in a non-transitory computer readable medium and intended to run on a receiving device connected to a network, the computer code configured to:
 receive media over a network at a receiving device;
 determine a latency for the received media;
 based on the latency, determine a consumption speed at which to render the media;
 render the media at the determined consumption speed;
 determine a difference between a render position in the media and a write position in the media wherein the render position indicates which portion of the media is currently being rendered and the write position indicates which portion of the media is currently being written to a storage system on the device;
 determine the latency based on a difference between the render and write positions;
 when the difference between the render and write positions exceeds a predetermined threshold, increase a rate at which the media is played so that the difference shrinks; and
 when the difference between the render and write positions falls below a predetermined threshold, reduce a rate at which the media is played so that the difference increases.

* * * * *